UNITED STATES PATENT OFFICE.

RUFUS N. PRATT, OF HARTFORD, CONNECTICUT, AND HENRY W. JOHNS, OF NEW YORK, N. Y.

COMPOSITION OF MATTER FOR COMPRESSED OR MOLDED ARTICLES.

SPECIFICATION forming part of Letters Patent No. 549,855, dated November 12, 1895.

Application filed June 2, 1887. Serial No. 240,085. (No specimens.)

*To all whom it may concern:*

Be it known that we, RUFUS N. PRATT, a resident of Hartford, in the county of Hartford and State of Connecticut, and HENRY W. JOHNS, a resident of New York city, New York, citizens of the United States, have invented a certain new and useful Composition of Matter for Compressed or Molded Articles, of which the following is a specification.

Our invention relates to an improved composition of matter for the manufacture of compressed or molded products.

Heretofore, as in the United States Patent granted to Rufus N. Pratt March 23, 1886, No. 338,358, asbestos fiber has been saturated or coated with a solution of rubber dissolved in naphtha to which sulphur has been added, the resulting mass being then pressed in molds and by a succession of pressing and drying operations formed into the desired shape or article, which was finally vulcanized.

We have discovered that the products made under Mr. Pratt's and other similar methods or plans can be very greatly improved by thoroughly incorporating with the asbestos, rubber, and vulcanizing materials substances which will give to the mass a lubricated quality or characteristic. This quality is serviceable during the use of many of the products which we make after their production, and also as a result of the addition of the lubricating material the compound during the act of molding the article, whatever its shape or purpose may be, flows or moves more easily when subjected to pressure in the dies or molds, thus improving the resulting products.

The substances which we prefer to use as the lubricating materials are plumbago, soapstone, talc, agolite, and other natural lubricants, and these separately or two or more of them mixed together we add, preferably in a finely-divided condition, to the mass of asbestos and rubber and sulphur during the mixing operation, and stir, knead, or otherwise manipulate the mass in such manner that the lubricating body or bodies are very thoroughly mixed and incorporated with the other ingredients. We then form the desired article by dies or molds and by drying and pressing, as above stated. Any form of mechanical appliances and any preferred method may be employed for forming or making the articles.

The proportion of the lubricating body or bodies relative to the other ingredients cannot be given with any degree of accuracy, because it will depend partly upon the special kind of lubricating body employed, also upon the special purpose to which the product is to be put, and the special needs of each special case must determine these quantities. We prefer, however, in all cases that there should be no undue excess of the lubricating bodies above the requirements of each case.

We prefer the asbestos to be fibrous, although the length of the fibers may differ in different instances because the resulting products are much stronger when asbestos is used in this form, nor is it essential that rubber should be used as the cementing or binding agent. Any material which will serve to cement or bind the component parts of the articles together, so as to give them the requisite toughness, density, strength, &c., may be employed—such, for instance, as shellac or equivalent material—but we much prefer the rubber, because it can be vulcanized.

We do not consider the several natural lubricants equivalents for all purposes—*i. e.*, plumbago would not answer where the composition is to be used for insulating purposes.

We claim—

1. The within described composition of matter consisting of asbestos, a binding and solidifying substance and an insulating natural lubricant as set forth.

2. The herein described composition of matter composed mainly of asbestos in fibrous condition permeated with an insulating natural lubricant in combination with a binding material of an adhesive character, substantially as set forth.

3. The within described composition of matter consisting of a fibrous mineral insulator, a cementing insulating substance such as rubber and a lubricator consisting of an insulating material as and for the purposes described.

4. A composition for an electrical insulating material consisting of asbestos, rubber and soapstone or other insulating equivalents as described combined in the manner and for the purposes set forth.

5. The within described composition of matter consisting of asbestos, a binding and solidifying substance and a natural lubricant as set forth.

Signed at New York, in the county of New York and State of New York, this 2d day of May, A. D. 1887.

RUFUS N. PRATT.
HENRY W. JOHNS.

Witnesses:
HENRY W. JOHNS, Jr.,
PHILLIPS ABBOTT.